US008840996B2

(12) United States Patent
Tsou et al.

(10) Patent No.: US 8,840,996 B2
(45) Date of Patent: Sep. 23, 2014

(54) PROCESSES FOR MAKING POLYOLEFIN NANOCOMPOSITES

(75) Inventors: Andy Haishung Tsou, Allentown, PA (US); Shuji Luo, Bridgewater, NJ (US); Donna Jean Crowther, Seabrook, TX (US); Victor DeFlorio, Cranford, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 13/329,792

(22) Filed: Dec. 19, 2011

(65) Prior Publication Data

US 2013/0158180 A1   Jun. 20, 2013

(51) Int. Cl.
   *B32B 9/00*   (2006.01)
(52) U.S. Cl.
   USPC ........... 428/405; 428/404; 525/100; 525/106; 523/202; 523/203; 523/205; 523/207; 523/212; 523/213
(58) Field of Classification Search
   USPC ................. 523/202, 203, 205, 207, 212, 213; 428/405, 404; 525/106, 100
   See application file for complete search history.

(56) References Cited

U.S. PATENT DOCUMENTS

| 4,705,571 | A  | * | 11/1987 | Lange et al. | 106/287.1 |
|---|---|---|---|---|---|
| 6,916,536 | B1 | * | 7/2005 | Hammen et al. | 428/407 |
| 8,318,998 | B2 |  | 11/2012 | Crowther et al. | |
| 8,399,724 | B2 |  | 3/2013 | Crowther et al. | |
| 2009/0298991 | A1 |  | 12/2009 | Kwon et al. | |
| 2009/0318644 | A1 |  | 12/2009 | Brant et al. | |
| 2010/0101606 | A1 |  | 4/2010 | Grunert | |
| 2010/0130687 | A1 | * | 5/2010 | Tu et al. | 525/104 |
| 2010/0227162 | A1 |  | 9/2010 | Patil et al. | |
| 2011/0028605 | A1 |  | 2/2011 | Nelson et al. | |
| 2012/0245276 | A1 |  | 9/2012 | Hagadorn et al. | |
| 2012/0245294 | A1 |  | 9/2012 | Stewart | |
| 2012/0245298 | A1 |  | 9/2012 | Hagadorn et al. | |
| 2012/0245300 | A1 |  | 9/2012 | Crowther et al. | |
| 2012/0245311 | A1 |  | 9/2012 | Crowther et al. | |
| 2012/0245312 | A1 |  | 9/2012 | Holtcamp et al. | |

FOREIGN PATENT DOCUMENTS

| CN | 101942171 | 1/2011 |
|---|---|---|
| CN | 101942171 | 12/2011 |
| WO | 2009155471 | 12/2009 |
| WO | 2009155472 | 12/2009 |
| WO | 2009155472 A8 | 12/2009 |
| WO | 2009155510 | 12/2009 |
| WO | 2009155510 A2 | 12/2009 |
| WO | 2009155517 | 12/2009 |
| WO | 2009155517 A8 | 12/2009 |

OTHER PUBLICATIONS

Cheng et al. "Synthesis of Silica/Polyolefin Nanocomposites via Two-step Method", Iranian Polymer Journal, 18(5), 2009, pp. 365-371.*
S. Lipponen, P. Pietkainen, U. Vainio, R. Serimaa and J.V. Seppala, "Silane Functionalized Ethylene/Diene Copolymer Modifiers in Composites of Heterophasic Polypropylene and Microsilica", Polymers & Polymer Composites, 2007, 15(5), 343-355.
J. Duchet, J.-P. Chapel, B. Chabert, R. Spitz and J.-F. Gerard, "Synthesis and Grafting Ability of Silane-Terminated Polyethylenes on Silica Surfaces", Journal of Applied Polymer Science, 1997, 65, 2481-2492.
I. Mora-Barrantes, A. Rodriguez, I. Ibarra, L. Gonzales and J.L. Valentin, "Overcoming the Disadvantages of Fumed Silica as Filler in Elastomer Composites", Journal of Materials Chemistry, 2011, 21(20), 7381-7392.
S. Lipponen, P. Pietkainen, U. Vainio, R. Serimaa and J. V. Seppala, "Silane-Functionalized Ethylene/Diene Copolymer Modifiers in Composites of Heterophasic Polypropylene and Microsilica", Polymers & Polymer Composites (2007), 15(5), 343-355.
J. Duchet, J.-P. Chapel, B. Chabert, R. Spitz and J.-F. Gerard, "Synthesis and Grafting Ability of Silane-Terminated Polyethylenes on Silica Surfaces", Journal of Applied Polymer Science (1997), 65(12), 2481-2492.
I. Mora-Barrantes, A. Rodriguez, L. Ibarra, L. Gonzales and J. L. Valentin, "Overcoming the disadvantages of fumed silica as filler in elastomer composites", Journal of Materials Chemistry (2011), 21(20), 7381-7392.

* cited by examiner

*Primary Examiner* — Margaret Moore
(74) *Attorney, Agent, or Firm* — Robert A. Migliorini

(57) ABSTRACT

A process for making a silica-polyolefin composite. The process has the steps of (a) reacting silica particles and an alkyl halosilane in the presence of a solvent and a catalyst to form silane-functionalized silica particles and (b) reacting the silane-functionalized silica particles with a vinyl-terminated polyolefin. There are other processes for making a silica-polyolefin composites. There are other processes for making metal phosphate-polyolefin composites.

48 Claims, 4 Drawing Sheets

PROCESSES FOR MAKING POLYOLEFIN NANOCOMPOSITES

FIELD

The present disclosure relates to processes for making polyolefin nanocomposites. The present disclosure relates to processes for making silica-polyolefin nanocomposites and metal phosphate-polyolefin nanocomposites.

BACKGROUND

Inorganic particles are widely used as fillers to improve mechanical and thermal properties of polymers and polymer composites. Such particles can decrease shrinkage and internal stresses during fabrication of polymer articles, increase thermal conductivity, enhance thermal stability and flame resistance, and reduce material cost. Useful inorganic particles include those of talc, calcium carbonate, mica, silica, alpha zirconium phosphates, and Kaolin clays. Conventional particles are typically microns or larger in size.

Polymer nanocomposites are polymers that contain nanofillers, i.e., fillers (particles) of nanometer dimensions. Polymer nanocomposites employing inorganic nanofillers are useful in a variety of applications because of their unique electronic, optical, and mechanical properties. Due to the physical dimensions of nanofillers, they offer very high interfacial areas, and, thus, very high interfacial interactions with the polymer matrix. The physical properties of polymer nanocomposites can be enhanced to a high degree with only a relatively small amount of nanofillers. Compared to fillers of conventional sizes, nanofillers provide enhanced physical properties to polymer composites without compromising fracture toughness and optical clarity.

The use of nanofillers in semi-crystalline polymer composites results in a new crystalline morphology and in a relatively large volume percent of interfacial or transition phase. At the same time, the relatively large surface/interface areas of nanofillers render them difficult to disperse in polymers. Further, the natural aggregation tendency of nanofillers also renders them difficult to disperse. The lack of dispersibility is an impediment to the development of polyolefin-based nanocomposites, especially those of non-polar semi-crystalline polyolefins. There are currently no commercially available non-polar nanofillers.

It would be desirable to have a process for making polyolefin nanocomposites having polar nanofillers. It would further be desirable to have a process for making nanocomposites of semi-crystalline polyolefins and polar nanofillers.

SUMMARY

According to the present disclosure, there is a process for making a silica-polyolefin composite. The process has the steps of (a) reacting silica particles and an alkyl halosilane in the presence of a solvent and a catalyst to form silane-functionalized silica particles and (b) reacting the silane-functionalized silica particles with a vinyl-terminated polyolefin.

Further according to the present disclosure, there is a process for making a silica-polyolefin composite. The process has the steps of (a) reacting silica particles and a mercapto alkylalkoxysilane in the presence of a solvent and a catalyst to form thiol-functionalized silica particles and (b) reacting the thiol-functionalized silica particles with a vinyl-terminated polyolefin.

Further according to the present disclosure, there is a process for making a silica-polyolefin composite. The process has the steps of (a) reacting silica particles and 1-(chlorosilyl) propyl 2-bromoisobutyrate in the presence of a solvent and a base to form silylpropyl 2-bromoisobutyrate-functionalized silica particles; (b) polymerizing alkyl acrylate at the surfaces of the silylpropyl 2-bromoisobutyrate-functionalized particles to form polyacrylate-functionalized silica particles; (c) capping the polyacrylate-functionalized silica particles via reaction with acrylic acid; (d) reacting vinyl-terminated polyolefin with an alkylchlorosilane in the presence of a solvent and a catalyst to form an alkylchlorosilane-functionalized polyolefin; and (e) reacting the alkylchlorosilane-functionalized polyolefin and the polyacrylate-functionalized silica particles.

Further according to the present disclosure, there is a process for making a silica-polyolefin composite. The process has the step of reacting silica particles, a mercapto alkylalkoxysilane, and a vinyl-terminated polyolefin together in the presence of a catalyst in a solvent or in an extruder with the polyolefin in its molten state.

Further according to the present disclosure, there is a process for making an alpha zirconium phosphate-polyolefin composite. The process has the steps of (a) reacting a vinyl terminated polyolefin with a peroxyacid in the presence of a solvent to form an epoxy-terminated polyolefin; (b) reacting the epoxy-terminated polyolefin with an amine-terminated polyalkylene glycol in the presence of a solvent and a catalyst to form a polyalkylene glycol-terminated polyolefin; and (c) reacting the polyalkylene glycol-terminated polyolefin and an alpha zirconium phosphate in the presence of a solvent.

Further according to the present disclosure, there is a process for making an alpha zirconium phosphate-polyolefin composite. The process has the steps of (a) reacting an alpha zirconium phosphate with thio-amine in the presence of a solvent to form a thioamine-substituted alpha zirconium phosphate; (b) reacting the thioamine-substituted alpha zirconium phosphate with a vinyl-terminated polyolefin in the presence of a catalyst.

Further according to the present disclosure, there is a process for making an alpha zirconium phosphate-polyolefin composite. The process has the step of reacting alpha zirconium phosphate particles, a thioamine, and a vinyl-terminated polyolefin together in the presence of a catalyst in a solvent or in an extruder with the polyolefin in its molten state.

DETAILED DESCRIPTION

Figure 1:
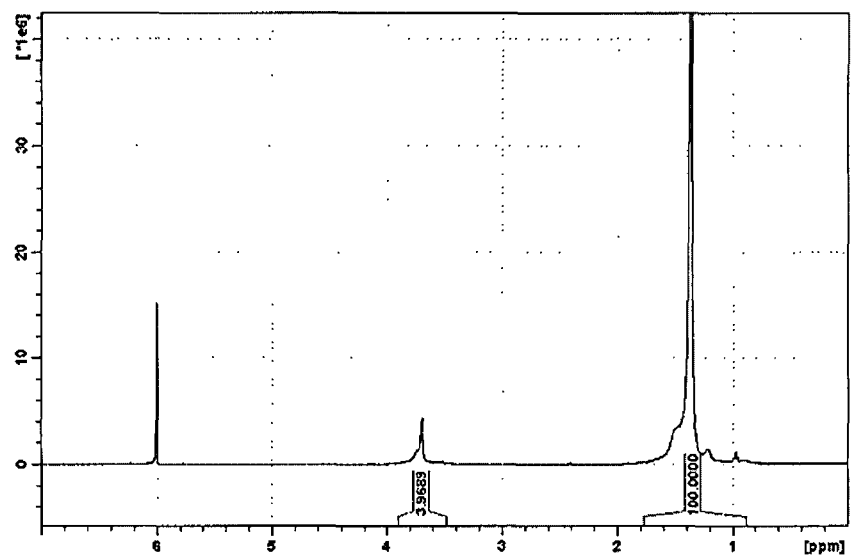
FIG. 1 is a plot of a $^1$H NMR of Jeffamine-PE (110° C., $CDCl_2CDCl_2$).
Figure 2:
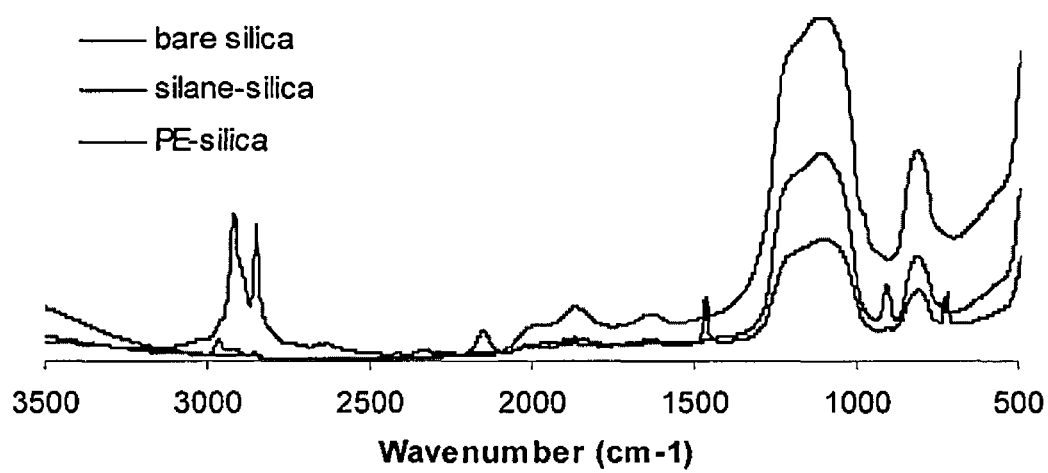
FIG. 2 is a plot of a PAS-IR of (1) bare silica (2) silane-silica (3) PE-silica 1.
Figure 3:
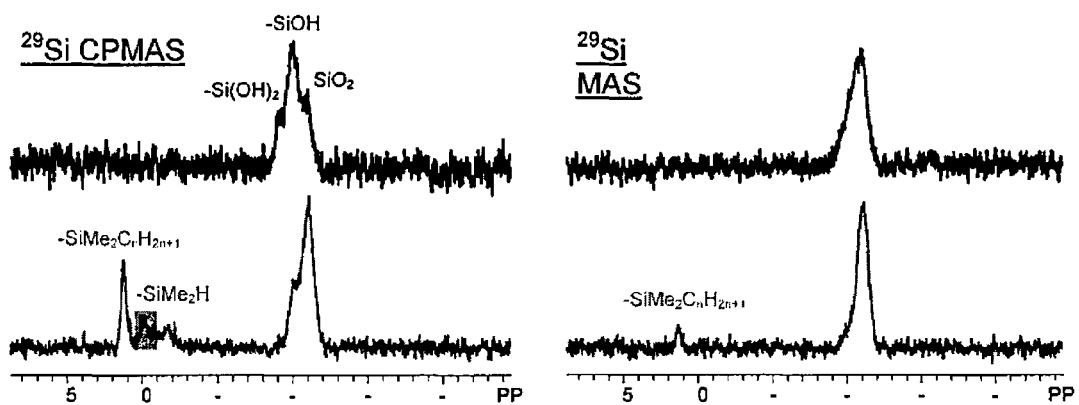
FIG. 3 is a plot of a solid state $^{29}$Si NMR of (1) bare silica (blue) (2) PE-silica 1 (orange).
Figure 4:
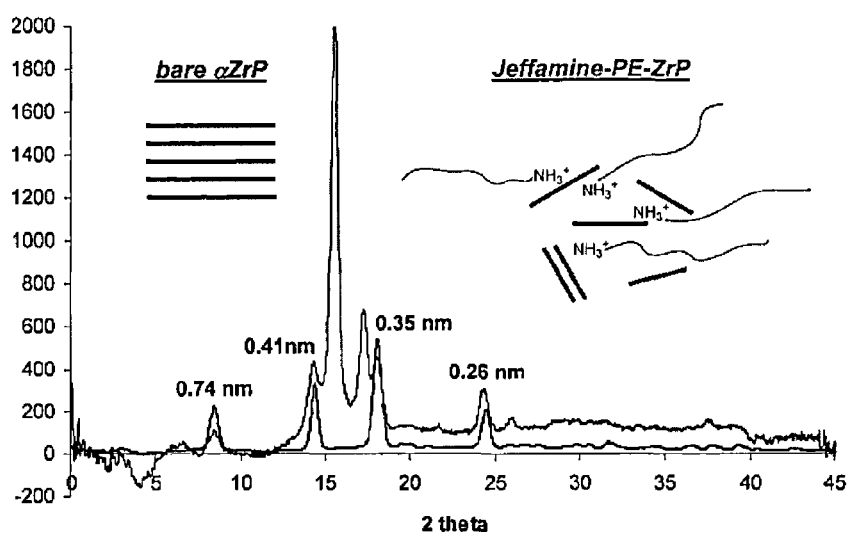
FIG. 4 is a plot of X-ray scattering data of (1) bare ZrP (2) Jeffamine-PE-ZrP.
Figure 5:
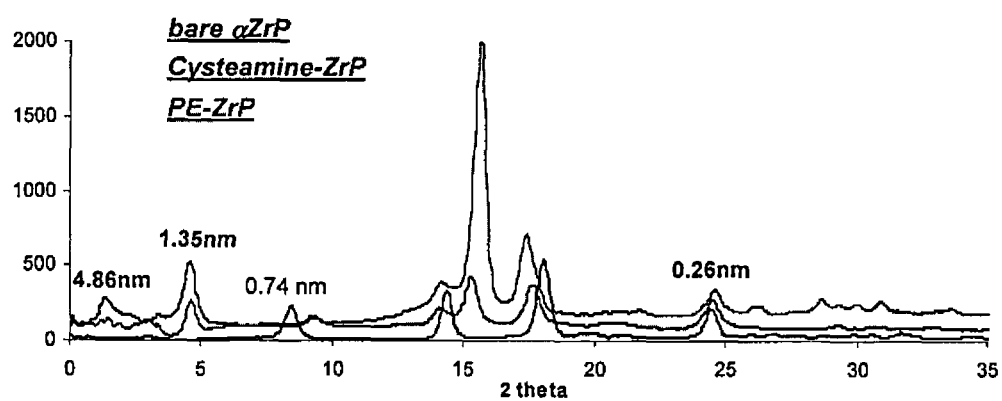
FIG. 5 is a plot of X-ray scattering data of (1) bare ZrP (2) cysteamine-ZrP (3) PE-ZrP.

All numerical values within the detailed description and the claims herein are modified by "about" or "approximately" the indicated value, and take into account experimental error and variations that would be expected by a person having ordinary skill in the art.

In the present disclosure, crystalline polyolefin chains are grafted onto the surface of inorganic nanoparticles. The regions of the polyolefin chains at the surface of the nanoparticles must be able to co-crystallize with the matrix polyolefin away from the surface to prevent crystallization-induced phase separation. The present disclosure employs processes for "grafting-to" the nanoparticles end-functionalized polymers that react with functional groups at the surfaces of the particles. The grafting process results in a nanocomposite of the inorganic particle and the polyolefin. The polyolefin-particle nanocomposite is useful as a blend additive for conventional polymers to enhance physical properties.

Inorganic particles useful in the processes of the present disclosure include silica (silicon dioxide), metal phosphates (such as $AlPO_4$, $FePO_4$, $SrHPO_4$, $CePO_4$, and alpha zirconium phosphates), nanoclays (hydrated sodium calcium aluminum silicate, such as montmorillonite, bentonite, smectite, synthetic hydrotalcite, synthetic hectorite,). Silica, aluminum phosphate, and iron phosphate typically takes the shape of nano-spheres, while alpha zirconium phosphates and nanoclays typically take the form of stacked nano-plates. Useful silica nano-spheres include fumed silica, precipitated silica, sol-gel silica and colloidal silica. Nanospheres preferably have diameters of less than 100 nanometers (nm) and most preferably less than 50 nm. Nanoplates preferably have plate widths of less than 1000 nm and most preferably less than 600 nm, while their single platelet thicknesses are preferably less than 20 nm and most preferably less than 10 nm.

Particular embodiments of polyolefin nanocomposites with spherical fumed silica and platy alpha-zirconium phosphate have been disclosed herein. Surface chemistry of fumed silica with predominantly hydroxyl groups can be found on the surfaces of other silica particles. The metal phosphate chemistry on the surface of alpha zirconium phosphate is common to surfaces of all metal phosphate fillers and is similar to the metal silicate surfaces found on nanoclay surfaces. Thus, the grafting chemistry of fumed silica can be applied to other forms of spherical silica. Further, the grafting chemistry of platy alpha-zirconium phosphate can be applied to other metal phosphates and to nanoclay fillers.

The polyolefin component is preferably 1% to 80%, more preferably from 3% to 70%, and most preferably from 5% to 40% of the total weight of the polyolefin-nanoparticle (polyolefin nanocomposite). The molecular weight of the polyolefin is preferably 500 to 50,000 and most preferably 1,000 to 25,000. Commercial nano silica particles, metal phosphate particles, and nanoclays can be used.

The vinyl-terminated polyolefin used to prepare the polyolefin nanocomposite may be any known in the art but is preferably those formed from olefins having 2 to 8 carbons per monomeric unit. The vinyl-terminated polyolefin is preferably selected from the group consisting of vinyl-terminated polyethylene, vinyl-terminated polypropylene, and vinyl-terminated ethylene-propylene copolymer. Useful vinyl-terminated polyolefins and methods for preparing same are disclosed in U.S. 2009/0318644, WO 20091555517, WO 2009/155510, WO 2009/1555471, and WO 2009/155472, all of which are incorporated herein by reference.

Processes for making the polyolefin nanocomposites of the present disclosure are set forth in the following paragraphs. Schemes 1 to 4 relate to representative processes for making (syntheses) silica-polyolefin nanocomposites and Schemes 5 and 6 relate to processes for making alpha zirconium phosphate-polyolefin nanocomposites. The polyolefin represented in the schemes below is polyethylene.

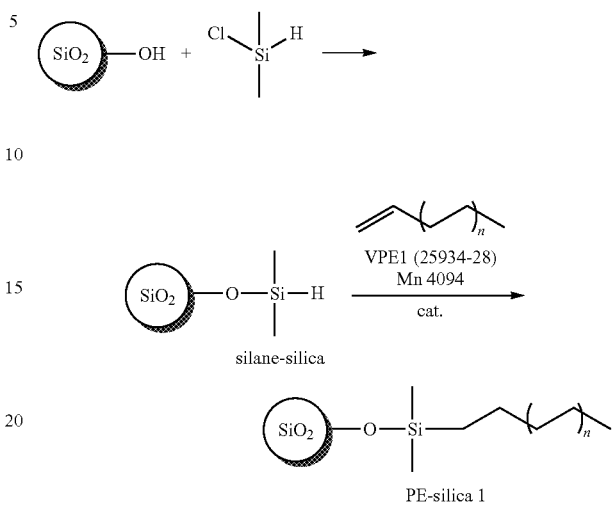

Scheme 1
(polyethylene-silica synthesis)

The process of Scheme 1 for making a silica-polyolefin composite has the steps of (a) reacting silica particles and an alkyl halosilane (dimethylchlorosilane) in the presence of a first solvent and a catalyst to form silane-functionalized silica particles and (b) reacting the silane-functionalized silica particles with a vinyl-terminated polyolefin (vinyl-terminated polyethylene) in the presence of a second solvent.

The silica and halosilane are present in an equivalent concentration ratio (silica/halosilane) of from 0.05 to 20 and preferably 0.1 to 0. The silane-functionalized silica and vinyl-terminated polyolefin are present in an equivalent concentration ratio (silica/polyolefin) of from 2 to 100 and preferably 5 to 50.

Step (a) is preferably carried out at a temperature of 20° C. to 150° C. and more preferably 20° C. to 80° C. Step (a) is preferably carried out for a time of 0.5 hour to 72 hours and more preferably 1 hour to 48 hours.

Step (b) is carried out at a temperature of 80° C. to 150° C. and more preferably 90° C. to 140° C. Step (b) is carried out for a time of 1 hour to 72 hours and more preferably 2 hours to 48 hours. Steps (a) and (b) are preferably carried out at ambient pressure.

The first solvent is preferably selected from among toluene, anisole, xylenes, methyl ethyl ketone, dichloromethane, and chlorobenzene. The second solvent is preferably selected from among toluene, anisole, xylenes, chlorobenzene, and trichlorobenzene. The first solvent and the second solvent may be the same or different.

Scheme 2
(polyethylene-silica synthesis)

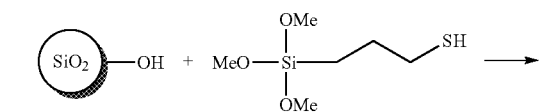

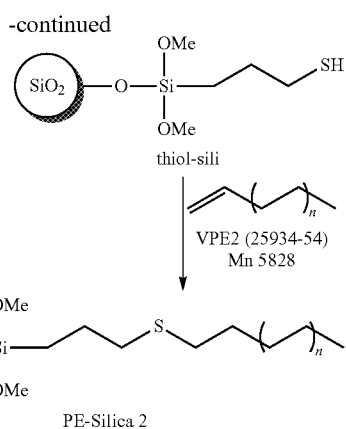

thiol-sili

PE-Silica 2

The process for Scheme 2 for making a silica-polyolefin composite has the steps of (a) reacting silica particles and a mercapto alkylalkoxysilane (3-mercaptopropyltrimethoxysilane) in the presence of a first solvent and a catalyst to form thiol-functionalized silica particles and (b) reacting the thiol-functionalized silica particles with a vinyl-terminated polyolefin (vinyl-terminated polyethylene) in the presence of a second solvent.

The mercapto alkylalkoxysilane is preferably selected from among 3-mercaptopropyltrimethoxysilane, 3-mercaptopropyltriethoxysilane, and 3-mercaptopropylmethyldimethoxysilane. A preferred mercapto alkylalkoxysilane is 3-mercaptopropyltrimethoxysilane. The silica and mercapto alkylalkoxysilane are present in an equivalent concentration ratio (silica/mercapto alkylalkoxysilane) of from 0.05 to 20. The thiol-functionalized silica and vinyl-terminated polyolefin are present in an equivalent concentration ratio (silica/polyolefin) of from 2 to 100.

The first solvent is preferably from among toluene, anisole, xylene(s), methyl ethyl ketone, dichloromethane, and chlorobenzene.

Step (a) is preferably carried out at a temperature of 20° C. to 150° C. and more preferably 40° C. to 140° C. Step (a) is preferably carried out for a time of 0.5 hour to 72 hours and more preferably 1 hour to 48 hours.

Step (b) is preferably carried out at a temperature of 80° C. to 150° C. and more preferably 90° C. to 140° C. Step (b) is preferably carried out for a time of 1 hour to 72 hours and more preferably 2 hours to 60 hours. Steps (a) and (b) are preferably carried out at ambient pressure.

The second solvent is preferably selected from among toluene, anisole, xylene(s), chlorobenzene, dichlorobenzene, and trichlorobenzene. The first solvent and the second solvent may be the same or different.

The catalyst in step (b) is preferably selected from among 2,2'-azoisobutyronitrile (AIBN), dicumylperoxide, benzophenone, thioxanthone, camphorquinone, (2,4,6-trimethylbenzoyl)diphenylphosphine oxide, 2,2-dimethoxy-2-phenyl acetophenone, and trimethylolpropane tris(2-mercaptoacetate).

Scheme 3
(silica-polyoctadecyl acrylate-polyethylene synthesis)

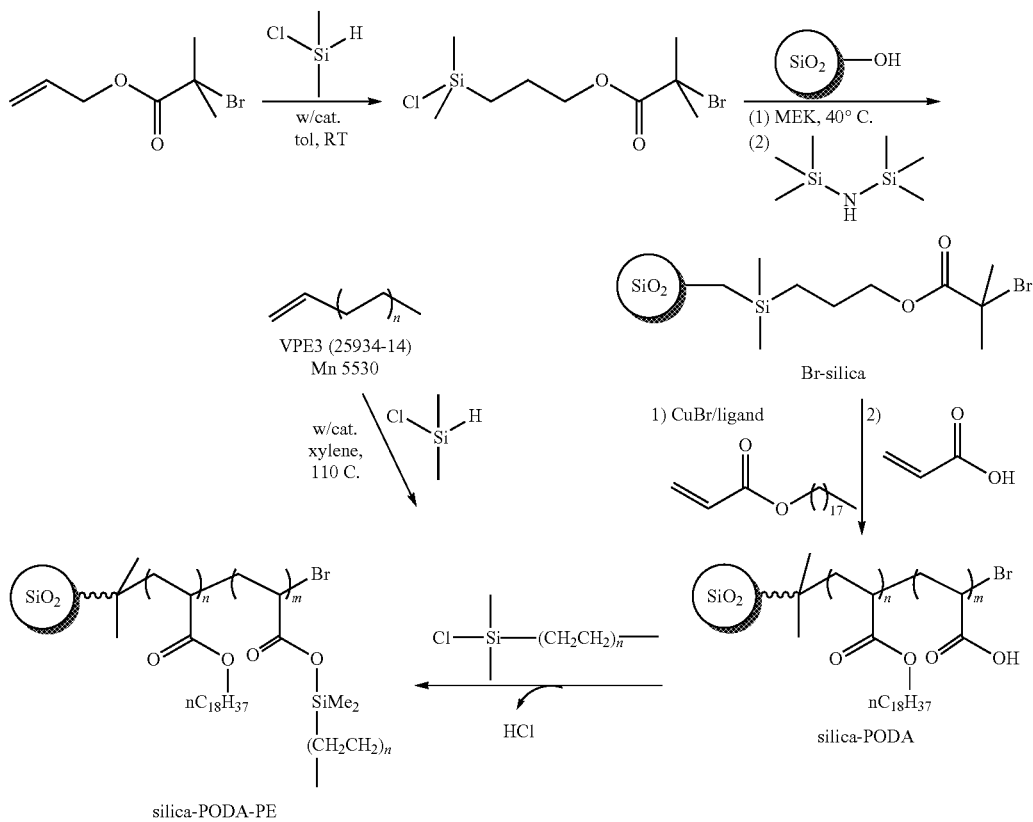

Scheme 3 is a process for making a silica-polyolefin composite. The process has the steps of (a) reacting silica particles and 1-(chlorosilyl)propyl 2-bromoisobutyrate in the presence of a first solvent and a base to form silylpropyl 2-bromoisobutyrate-functionalized silica particles; (b) polymerizing alkyl acrylate at the surfaces of the silylpropyl 2-bromoisobutyrate-functionalized particles in the presence of a second solvent to form polyacrylate-functionalized silica particles; (c) capping the polyacrylate-functionalized silica particles via reaction with acrylic acid in the presence of a third solvent; (d) reacting vinyl-terminated polyolefin with an alkylchlorosilane in the presence of a fourth solvent and a catalyst to form an alkylchlorosilane-functionalized polyolefin; and (e) reacting the alkylchlorosilane-functionalized polyolefin and the polyacrylate-functionalized silica particles in the presence of a fifth solvent. The 1-(chlorosilyl)propyl 2-bromoisobutyrate is preferably prepared by reacting allyl 2-bromo-2-methylpropionate and alkylchlorosilane in the presence of a catalyst, e.g. platinum(0)-1,3-divinyl-1,1,3,3-tetramethyldisiloxane complex.

The alkylchlorosilane is preferably selected from the group consisting of dimethylchlorosilane, and chloro(methyl)phenylsilane. A preferred alkylchlorosilane is dimethylchlorosilane.

The 1-(chlorosilyl)propyl 2-bromoisobutyrate and silica are preferably present in an equivalent concentration ratio (1-(chlorosilyl)propyl 2-bromoisobutyrate/silica) of 0.05 to 20 more preferably 0.1 to 10.

Step (a) is preferably carried out at a temperature of 20° C. to 120° C. and more preferably 20° C. to 90° C. Step (a) is preferably carried out for a time from 0.5 hour to 72 hours and more preferably 1 hour to 48 hours.

The base is preferably selected from the group consisting of hexamethyldisilazane, pyridine, and imidazole. The first solvent is preferably selected from the group consisting of methyl ethyl ketone, toluene, and anisole.

Step (b) is preferably carried out at a temperature of 50° C. to 120° C. and more preferably 60° C. to 110° C. Step (b) is preferably carried out for a time from 12 hour to 240 hours and more preferably 2 hours to 72 hours.

The alkyl acrylate is preferably selected from the group consisting of octadecyl acrylate and longer alkyl acrylates. The alkyl acrylate and silylpropyl 2-bromoisobutyrate-functionalized silica are preferably present in an equivalent concentration ratio (acrylate/silica) of from 1 to 100 and more preferably 2 to 50.

The second solvent is preferably selected from the group consisting of toluene, anisole, and xylenes.

Step (c) is carried out at a temperature of 50° C. to 120° C. and more preferably 60° C. to 110° C. Step (c) is preferably carried out for a time from 1 hour to 72 hours and more preferably 2 hours to 48 hours.

The acrylic acid and polyacrylate-functionalized silica are preferably present in an equivalent concentration ratio (acrylic acid/silica) of from 0.05 to 2 and more preferably 0.1 to 1.5.

The third solvent is preferably selected from the group consisting of toluene, anisole, and xylenes.

The alkylchlorosilane is selected from the group consisting of chlorodimethylsilane and chloro(methyl)phenylsilane. The alkylchlorosilane and vinyl-terminated polyolefin are preferably present in an equivalent concentration ratio (alkylchlorosilane/polyolefin) of from 1 to 100 and more preferably 2 to 50.

Step (d) is carried out at a temperature of 80° C. to 150° C. and more preferably 90° C. to 140° C. Step (d) is preferably carried out for a time from 1 to 72 hours and more preferably 2 hours to 48 hours. The alkylchlorosilane-functionalized polyolefin is preferably prepared by reacting the vinyl-terminated polyolefin with the alkylchlorosilane in the presence of a catalyst, e.g. platinum(0)-1,3-divinyl-1,1,3,3-tetramethyldisiloxane complex.

The fourth solvent is selected from the group consisting of toluene, xylene(s), chlorobenzene, dichlorobenzene, and trichlorobenzene.

The alkylchlorosilane-functionalized polyolefin and polyacrylate-functionalized silica are preferably present in an equivalent concentration ratio (polyolefin/silica) of from 0.05 to 20 and more preferably 0.1 to 10.

Step (e) is carried out at a temperature of 80° C. to 150° C. and more preferably 90° C. to 140° C. Step (e) is carried out for a time from 12 hours to 72 hours and more preferably 16 hours to 48 hours. The fifth solvent is preferably selected from the group consisting of toluene, xylene(s), chlorobenzene, dichlorobenzene, and trichlorobenzene.

Solvents used in the steps may be the same or different. The process steps are preferably carried out at ambient pressure.

Scheme 4
(Representative polyethylene-silica synthesis)

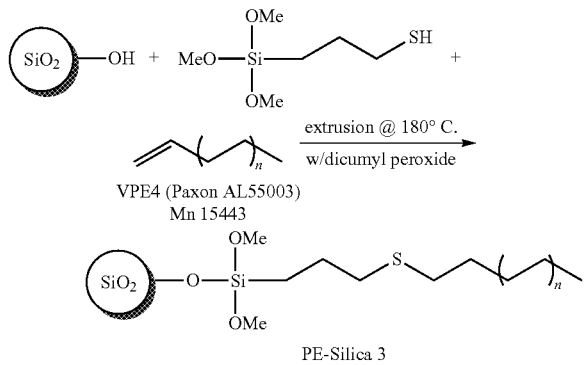

Scheme 4 is a process for making a silica-polyolefin composite. The process has the step of reacting silica particles, a mercapto alkylalkoxysilane (3-mercaptopropyltrimethoxysilane), and a vinyl-terminated polyolefin (vinyl-terminated polyethylene) together in the presence of a catalyst.

The mercapto alkylalkoxysilane is selected from among 3-mercaptopropyltrimethoxysilane, 3-mercaptopropyltriethoxysilane, and 3-mercaptopropylmethyldimethoxysilane. A preferred mercapto alkylalkoxysilane is 3-mercaptopropyltrimethoxysilane.

The silica and mercapto alkylalkoxysilane are preferably present in an equivalent concentration ratio (silica/mercapto alkylalkoxysilane) of from 0.05 to 20 and more preferably 0.1 to 10. The silica and vinyl-terminated polyolefin are preferably present in an equivalent concentration ratio (silica/polyolefin) of from 1 to 100 and more preferably 2 to 50.

The catalyst is preferably selected from 2,2'-azoisobutyronitrile (AIBN), dicumylperoxide, benzophenone, thioxanthone, camphorquinone, (2,4,6-trimethylbenzoyl)diphenylphosphine oxide, 2,2-dimethoxy-2-phenyl acetophenone, and trimethylolpropane tris(2-mercaptoacetate).

The process is preferably carried out at a temperature of 120° C. to 220° C. and more preferably 130° C. to 200° C. The process is preferably carried out for a time of 0.5 minute to 1 hour and more preferably 1 minute to 0.5 hour.

The process is preferably carried out at ambient pressure. A preferred process is a reactive extrusion process. Preferably, the extruder is operated at an RPM (revolutions per minute) of 30 to 500.

polyethylene glycol, di- or poly-amine-functionalized polypropylene glycol, and poly(ethylene-co-propylene)glycol.

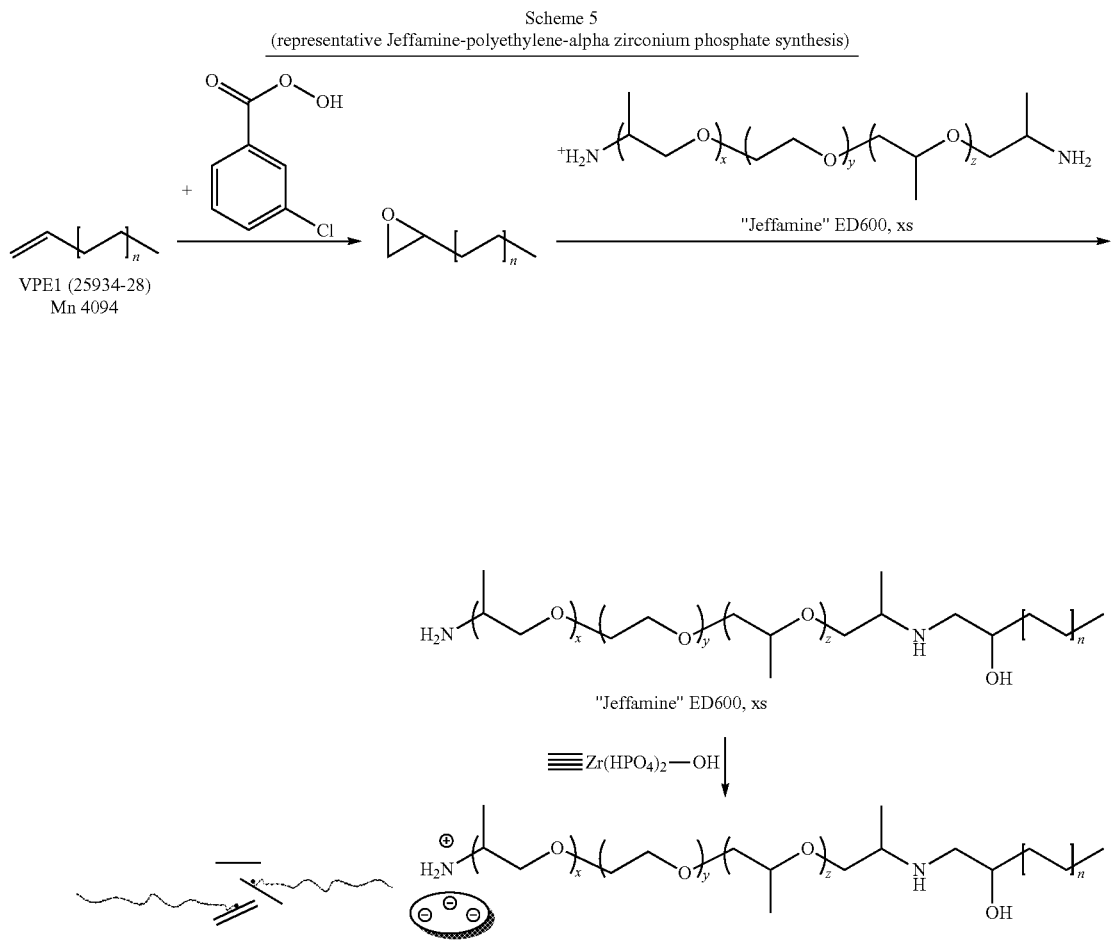

Scheme 5 is a process for making an alpha zirconium phosphate-polyolefin composite. The process has the steps of (a) reacting a vinyl terminated polyolefin (vinyl-terminated polyethylene) with a peroxyacid (3-chloroperbenzoic acid) in the presence of a first solvent to form an epoxy-terminated polyolefin; (b) reacting the epoxy-terminated polyolefin with an amine-terminated polyalkylene glycol in the presence of a second solvent and a catalyst to form a polyalkylene glycol-terminated polyolefin; and (c) reacting the polyalkylene glycol-terminated polyolefin and an alpha zirconium phosphate in the presence of a third solvent.

The peroxyacid and vinyl-terminated polyolefin are preferably present in an equivalent concentration ratio (peroxyacid/polyolefin) of from 1 to 5 and more preferably 1.05 to 3.

Step (a) is preferably carried out at a temperature of 80° C. to 120° C. and more preferably 90° C. to 110° C. Step (a) is preferably carried out and for a time from 1 hour to 72 hours and more preferably 2 hours to 48 hours.

The first solvent is selected from among toluene, xylene(s), chlorobenzene, dichlorobenzene, and trichlorobenzene.

The amine-terminated polyalkylene glycol is selected from the group consisting of di- or poly-amine-functionalized The amine-terminated polyalkylene glycol and epoxy-terminated polyolefin are preferably present in an equivalent concentration ratio (polyalkylene glycol/polyolefin) of from 1 to 100 and more preferably 2 to 50.

Step (b) is preferably carried out at a temperature of 80° C. to 150° C. and more preferably 90° C. to 140° C. Step (b) is preferably carried out for a time of 1 hour to 72 hours and more preferably 2 hours to 48 hours.

The second solvent is selected from among toluene, xylenes, chlorobenzene, dichlorobenzene, and trichlorobenzene.

The polyalkylene glycol-terminated polyolefin and alpha zirconium phosphate are preferably present in an equivalent concentration ratio (polyolefin/ZrP) of from 0.05 to 20 and more preferably 0.1 to 10.

Step (c) is carried out at a temperature of 80° C. to 150° C. and more preferably 90° C. to 140° C. Step (c) is preferably carried out for a time from 1 hour to 72 hours and more preferably 2 hour to 48 hours.

The third solvent is selected from among toluene and xylenes. The first, second, and third solvents may be the same or different.

The process is preferably carried out at ambient pressure.

Scheme 6
(representative polyethylene-alpha zirconium phosphate synthesis)

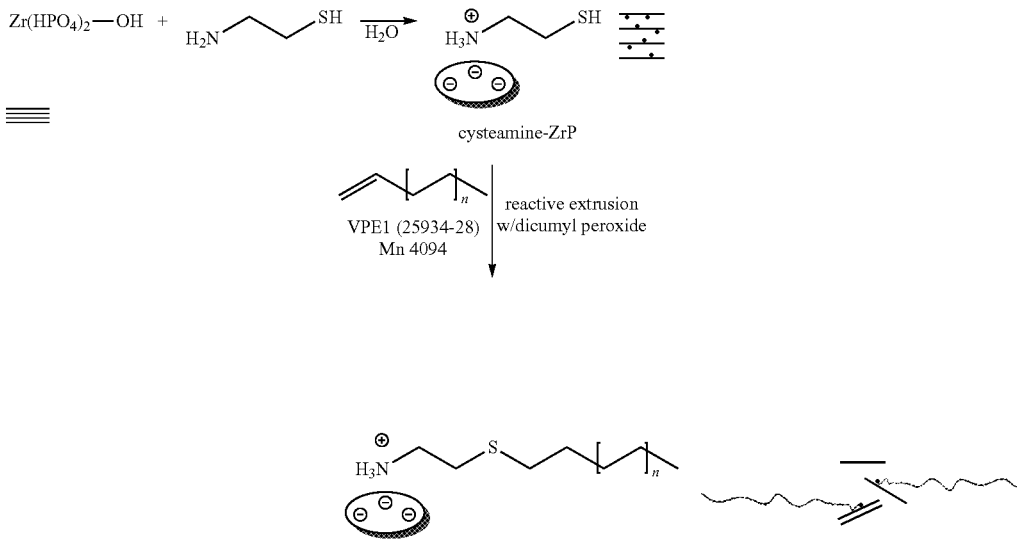

Scheme 6 is a process for making an alpha zirconium phosphate-polyolefin composite. The process has the steps of (a) reacting an alpha zirconium phosphate with thioamine (cysteamine) in the presence of a solvent to form a thioamine-substituted alpha zirconium phosphate and (b) reacting the thioamine-substituted alpha zirconium phosphate with a vinyl-terminated polyolefin (vinyl-terminated polyethylene) in the presence of a catalyst.

The thioamine is preferably selected from the group consisting of cysteamine, 3-mercapto-N-nonylpropionamide, 11-azido-1-undecanethiol, cysteamine hydrochloride, 3-amino-1-propanethiol hydrochloride, 6-amino-1-propanethiol hydrochloride, and (11-mercaptoundecyl)-N,N,N-trimethylammonium bromide. A preferred thioamine is cysteamine.

The thioamine and alpha zirconium phosphate are preferably present in an equivalent concentration ratio (thioamine/ZrP) of 1 to 100 and more preferably 2 to 50.

The solvent is preferably selected from among water and ethanol.

Step (a) is preferably carried out at a temperature of 20° C. to 50° C. and more preferably 20° C. to 40° C. The process is preferably carried out for a time of 1 hour to 72 hours and more preferably 2 hours to 48 hours.

Step (b) is preferably carried out at a temperature of 120° C. to 220° C. and more preferably 140° C. to 200° C. The process is preferably carried out for a time of 1 minute to 1 hour and more preferably 3 minutes to 0.5 hour. Step (b) is preferably a reactive extrusion process. Preferably, the extruder is operated at an RPM of 30 to 100.

The vinyl-terminated polyolefin and thioamine-substituted alpha zirconium phosphate are present in an equivalent concentration ratio (polyolefin/ZrP) of 0.05 to 20 and more preferably 0.1 to 10.

The catalyst is preferably selected from 2,2'-azoisobutyronitrile (AIBN), dicumylperoxide, benzophenone, thioxanthone, camphorquinone, (2,4,6-trimethylbenzoyl)diphenylphosphine oxide, 2,2-dimethoxy-2-phenyl acetophenone, trimethylolpropane tris(2-mercaptoacetate). A preferred catalyst is dicumyl peroxide.

Scheme 7

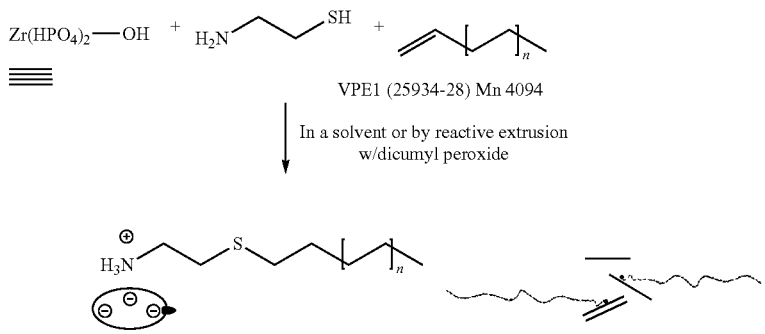

Scheme 7 is a process for making an alpha zirconium phosphate-polyolefin composite. The process has the step of reacting alpha zirconium phosphate particles, a thioamine, and a vinyl-terminated polyolefin together (a) in the presence of a catalyst in a solvent or (b) in an extruder with the polyolefin in a molten state and in the presence of a catalyst.

The thioamine is preferably selected from the group consisting of cysteamine, 3-mercapto-N-nonylpropionamide, 11-azido-1-undecanethiol, cysteamine hydrochloride, 3-amino-1-propanethiol hydrochloride, 6-amino-1-propanethiol hydrochloride, and (11-mercaptoundecyl)-N,N,N-trimethylammonium bromide. A preferred thioamine is cysteamine.

The thioamine and alpha zirconium phosphate are preferably present in an equivalent concentration ratio (thioamine/ZrP) of 1 to 100 and more preferably 2 to 50.

The vinyl-terminated polyolefin and thioamine-substituted alpha zirconium phosphate are present in an equivalent concentration ratio (polyolefin/ZrP) of 0.05 to 20 and more preferably 0.1 to 10.

The catalyst is preferably selected from 2,2'-azoisobutyronitrile (AIBN), dicumylperoxide, benzophenone, thioxanthone, camphorquinone, (2,4,6-trimethylbenzoyl)diphenylphosphine oxide, 2,2-dimethoxy-2-phenyl acetophenone, trimethylolpropane tris(2-mercaptoacetate). A preferred catalyst is dicumyl peroxide.

The solvent is preferably selected from among toluene and xylenes.

Process (a) of scheme 7, the solvent process, is preferably carried out at a temperature of 120° C. to 220° C. and more preferably 130° C. to 200° C. The process is preferably carried out for a time of 0.5 minute to 1 hour and more preferably 1 minute to 0.5 hour. The process is preferably carried out at ambient pressure.

Process (b) of scheme 7 is a reactive extrusion process. Preferably, the extruder is operated at an RPM (revolutions per minute) of 30 to 500. The process is preferably carried out for a time of 0.5 minute to 1 hour and more preferably 0.5 minute to 30 minutes. The process is preferably carried out at ambient pressure.

The polyolefin-particle nanocomposite of the present disclosure is useful as a blend additive for conventional polymers to enhance physical properties. Physical properties that may be enhanced include modulus, stiffness, and gas barrier resistance. Useful conventional polymers include, but are not limited to, the following: low density polyethylene (LDPE), linear low density polyethylene (LLDPE), medium density polyethylene (MDPE), high density polyethylene (HDPE), isotactic polypropylene, ethylene-propylene copolymers, and polybutylene. The amount of polyolefin-particle added to the conventional polymer to enhance physical properties will vary depending on the physical property enhancement sought, the properties of the polyolefin-nanoparticle, and the properties of the matrix polymer. Typically, the amount added will vary from 0.01 wt % to 20 wt %, more preferably 0.05 wt % to 15 wt %, and most preferably 0.1 wt % to 10 wt % based on the total weight of the blend. The grafted polyolefin grafted to the surface of the inorganic particles enables the polyolefin nanocomposite to exhibit excellent dispersion in conventional plastics.

The following are examples of the present disclosure and are not to be construed as limiting. All parts and percentages are by weight unless otherwise indicated.

EXAMPLES

Polyolefin nanocomposites were prepared by processes of the present disclosure. Samples of the polyolefin nanocomposites were then blended with LLDPE and tested for impact on Young's Modulus relative to a control.

Preparation of Vinyl-Terminated Polyethylene (VPE1-3)

VPE was synthesized in a 300 mL stainless steel autoclave reactor using the organometallic catalyst shown below. A catalyst solution was prepared by first mixing the iron complex with 10 equivalents methyl-aluminoxane (in toluene), stirring for 10 minutes, and then adding 1.05 equivalents of trityl tetrakis(perfluorophenyl)borate. The mixture was stirred for 5 minutes and then transferred to the autoclave reactor. Polymerization was conducted at 80° C. for 2 hours after the reactor was pressurized with 200 pounds per square inch gauge (psig) ethylene. The polymer was precipitated out of methanol and then filtered and dried under vacuum at 75° C. overnight. VPE1 had 100% vinyl chain end content and its number average molecular weight was 4,100 g/mol. VPE2 had 100% vinyl chain end content and its number average molecular weight was 5,800 g/mol. VPE3 had 100% vinyl chain end content and its number average molecular weight was 5,500 g/mol. The catalyst used to synthesize the VPE1-3 is depicted in the formula below.

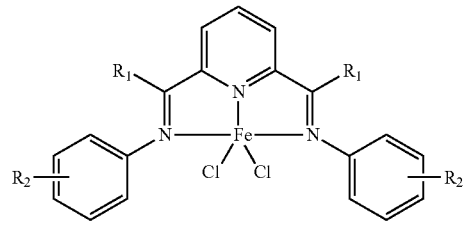

Example 1

Preparation of PE-Silica 1 (Corresponding to Scheme 1: Representative PE-Silica 1 Synthesis Above)

Preparation of Silane-Functionalized Silica (Silane-Silica)

In a round-bottomed flask, fumed silica (Aldrich, 14-20 nm, 0.418 g) was dispersed in toluene (40 mL) under nitrogen flow. The mixture was vigorously stirred and chlorodimethylsilane (6.2 g) was added. The mixture was stirred for 22 hours at room temperature under nitrogen flow, after which the mixture was stripped under vacuum to remove the toluene and unreacted chlorodimethylsilane. FT-IR showed that silane had been attached to the silica.

Preparation of PE-Silica 1

To a round-bottomed flask, silane-silica (0.4 g) was mixed with VPE1 (0.32 g) and xylenes (40 mL). The mixture was heated to 110° C. with stirring to disperse the silica and to dissolve the VPE. The flask was then cooled down and platinum(0)-1,3-divinyl-1,1,3,3-tetramethyldisiloxane complex (solution in xylene, Pt ~2%, 0.1 mL) was added. The mixture was reheated to 110° C. under nitrogen flow and kept at the temperature for 3 days, after which the mixture was cooled down and stripped under vacuum to remove the solvent. FT-IR and solid state $^{29}Si$ NMR showed that majority of the silane-silica had reacted with VPE.

Example 2

Preparation of PE-Silica 2 (Corresponds to Scheme 2: Representative PE-Silica 2 Synthesis Above)

Preparation of Thiol-Functionalized Silica (Thiol-Silica)

In a round-bottomed flask, fumed silica (Aldrich, 14-20 nm, 2 g) was dispersed in toluene (100 mL) under nitrogen flow. The mixture was vigorously stirred and 3-mercaptopropyltrimethoxysilane (2.81 g) was added. The mixture was heated to 100° C. with stirring for 21 hours at under nitrogen flow, after which the mixture was cooled down, stripped under vacuum to remove toluene. Unreacted 3-mercaptopropyltrimethoxysilane was removed by centrifugation in hexanes. The isolated solid was washed several times with hexanes then dried in a vacuum oven to yield 1.81 g (grams) of white solid. FT-IR showed that 3-mercaptopropyltrimethoxysilane had been attached to the silica.

Preparation of PE-Silica 2

To a round-bottomed flask, the thiol-silica (1.0 g) was mixed with VPE2 (4.8 g), AIBN (0.14 g) and xylenes (300 mL). The mixture was heated to 125° C. with stirring to disperse the silica and to dissolve the VPE. After 51 hours, the mixture was cooled down and stripped under vacuum to remove the solvent. The solid was then washed by methanol and dried in vacuum oven to yield 5.58 g of product.

Example 3

Preparation of Silica-PODA-PE (Corresponds to Scheme 3: Representative Silica-PODA-PE Synthesis)

Preparation of Silica-Bound ATRP Initiator (Br-Silica)

To a round-bottomed flask, allyl 2-bromo-2-methylpropionate (2.5 mL) was mixed with dry toluene (30 mL) under nitrogen flow. Chlorodimethylsilane (12.2 mL) was added dropwise to the flask and subsequently Platinum(0)-1,3-divinyl-1,1,3,3-tetramethyldisiloxane complex (solution in xylene, Pt ~2%, 0.3 mL). The mixture was stirred under nitrogen for 3 days, after which the mixture was stripped under vacuum to remove toluene and unreacted chlorodimethylsilane. The product, 1-(chlorodimethylsilyl)propyl 2-bromoisobutyrate, was obtained as a yellow oil. 1.6 mL of this oil was then added via syringe to a silica/MEK (Methyl Ethyl Ketone) suspension (Nissan, 30 wt % suspended in MEK, particle size of $SiO_2$ ~15-20 nm, 13 g) in a round-bottomed flask under nitrogen flow. The mixture was stirred for 24 hours at 50° C., after which the mixture was cooled down and hexamethyldisilazane (1.5 mL) was added. The mixture was stirred at room temperature for 3 hours and heated to 40° C. for overnight, after which the mixture was cooled down. The precipitate was removed by centrifugation (5000 rpm for 0.5 hours), and the supernatant was added dropwise into hexane to precipitate colloids. The particles were washed with hexanes for several times and dried under vacuum. Solution NMR of the silica-bound initiator (Br-silica) showed no peaks for 1-(chlorodimethylsilyl)propyl 2-bromoisobutyrate or allyl 2-bromo-2-methylpropionate indicating that all free initiator was gone.

Preparation of Silica-Bound Polyoctadecyl Acrylate (Silica-PODA)

In a nitrogen-filled glovebox, a round-bottomed flask was charged with the Br-silica (100 mg), dry anisole (solvent, 1.4 mL), octadecyl acrylate (ODA, 2.4 g), CuBr (initiator, 10 mg) and N,N,N',N",N"-pentamethyldiethylenetriamine (PMDETA, ligand, 19 mg). The mixture was stirred vigorously forming a green-blue solution, after which the mixture was heated to 90° C. for 4 days. $^1$H NMR of the mixture showed that 18% of ODA was converted to PODA. The mixture was then cooled down, and the reaction was quenched by exposure to air. The mixture was diluted with THF and added dropwise to acetone while stirring. The resulting cloudy mixture was filtered. The precipitate was washed with acetone 3 times and dried under vacuum for several hours at 60° C. Yield was 0.4 g crystalline solid.

Capping the Silica-PODA by Acrylic Acid

In a nitrogen-filled glovebox, a round-bottomed flask was charged with the silica-PODA (0.4 g), dry anisole (6 mL), acrylic acid (50 mg), CuBr (42 mg) and PMDETA (80 mg). The mixture was stirred vigorously forming a green-blue solution, after which the mixture was heated to 90° C. for overnight. The mixture was then cooled down and the reaction was quenched by exposure to air. The mixture was diluted with THF and added dropwise to acetone while stirring. The resulting cloudy mixture was filtered. The precipitate was washed with acetone 3 times and dried under vacuum for several hours at 60° C. Yield was 0.329 g crystalline solid.

Conversion of VPE to Chlorodimethylsilyl-Terminated PE (ClSi—PE)

To a round-bottomed flask equipped with a water condenser, VPE3 (3.0 g) was mixed with o-xylene (250 mL). The mixture was heated to 115° C. with stirring, and a homogeneous solution was formed. The flask was then cooled down and dimethylchlorosilane (2.0 mL) was added. Platinum(0)-1,3-divinyl-1,1,3,3-tetramethyldisiloxane complex (solution in xylene, Pt ~2%, 0.2 mL) was injected into the flask. The mixture was reheated to 110° C. for 2 days, and then the mixture was cooled down and stripped under vacuum to remove the solvent and unreacted dimethylchlorosilane. The dried product was stored in a glove box.

Preparation of Silica-PODA-PE

In a nitrogen-filled glovebox, a round-bottomed flask was charged with silica-PODA (0.1 g), ClSi—PE (0.2 g) and dry o-xylene (40 mL). The flask was taken out and connected to nitrogen flow and then heated to 110° C. with stirring for overnight. The mixture was then cooled down and stripped under vacuum. The product was washed with hexanes and dried under vacuum. Yield was 0.208 g.

Example 4

Preparation of PE-Silica 3 (Corresponds to Scheme 4: Representative PE-Silica 3 Synthesis)

Fumed silica (1.0 g) was blended with 3-mercaptopropyltrimethoxysilane (0.33 g), VPE4 (Paxon AL 55003, 50 g, 96% vinyl) and dicumyl peroxide (0.05 g) using a Nano-16 extruder running at 180° C., 50 RPM, 100 g/hr feed rate.

Example 5

Preparation of Jeffamine-PE Exfoliated αZrP (Jeffamine-PE-ZrP) (Corresponds to Scheme 5: Representative Jeffamine-Polyethylene-Alpha Zirconium Phosphate Synthesis)

Preparation of Epoxy-Terminated PE (EPE)

To a 250 mL round-bottomed flask fitted with a nitrogen inlet, VPE1 (2.0 g) was mixed with 1,2,4-trichlorobenzene (100 mL), and the mixture was heated to 110° C. with stirring to form a homogeneous solution. The mixture was cooled to 90° C. and the 3-chloroperbenzoic acid (solution in 1,2,4-trichlorobenzene, 1.5 equiv.) was added slowly by an addition funnel. The temperature was kept at 110° C. for overnight.

Then the mixture was cooled down. The polymer was precipitated out of methanol and dried under vacuum.

Preparation of Jeffamine-PE

To a round-bottomed flask, EPE (1.0 g) was mixed with Jeffamine ED600 (Huntsman, 2.36 g) and 1,2,4-trichlorobenzene (50 mL). The mixture was heated to 110° C. with stirring. Magnesium bromide etherate (20 mg) was added as a catalyst. The mixture was then heated to 120° C. for 3 days, after which the mixture was cooled down. The product was precipitated out of methanol and washed thoroughly by methanol to remove any unreacted Jeffamine. The product was further subjected to Soxhlet extraction using methanol as the extraction solvent. The purified product was shown by $^1$H NMR to have the composition of Jeffamine and PE, which offers evidence that the product is a copolymer.

Preparation of Jeffamine-PE Exfoliated αZrP

To a round-bottomed flask, Jeffamine-PE (0.32 g) was mixed with toluene (30 mL). The mixture was heated to 100° C. with stirring. αZrP (alpha Zirconium Phosphate nanoplate stacks with a single platelet of 150 nm diameter and 1 nm thickness) suspension in water (Rhodia, 5.7 wt %, 2.4 g) was then added to the flask. The water vapor was gradually vented through a nitrogen bubbler into the fume hood. The reaction was continued at 100° C. for 3 days, after which the mixture was cooled down and stripped under vacuum to remove toluene and water. The product was obtained as a light brown solid. XRD analysis showed that the αZrP scattering peak intensity at d=7.6 Å is lowered significantly compared to that of the untreated αZrP indicating partial exfoliation of the αZrP.

Example 6

Preparation of PE-ZrP

Preparation of Cysteamine-Intercalated αZrP (Cysteamine-ZrP)

To a round-bottomed flask, αZrP suspension in water (Rhodia, 5.7 wt %, 21.17 g) was mixed with distilled water (100 mL). Cysteamine (1.18 g) was mixed with distilled water (45 mL) and the solution was added to the flask dropwise. After the addition was complete, the mixture was stirred for 64 hours at room temperature, after which the milky suspension was diluted in distilled water and centrifuged. The solid phase was collected and dried under vacuum. X-ray scattering data showed that the αZrP scattering peaks shifted towards smaller angles (or larger d values) compared to those of the untreated αZrP indicating that αZrP was successfully intercalated.

Preparation of PE-ZrP

Cysteamine-ZrP (0.4 g) was blended with VPE1 (2.6 g) and dicumyl peroxide (16 mg) using a DSM twin-screw miniature extrusion mixer running at 165° C., 100 RPM for 5 minutes. X-ray scattering data showed that some αZrP scattering peaks (e.g. 4.86 and 1.35 nm) decreased as compared to those of the cysteamine-ZrP indicating partial exfoliation of αZrP.

Blending and Testing

Silica-PE and silica-PODA-PE hybrids were blended with Exceed™ 1018 (LLDPE, Linear Low Density Polyethylene, ExxonMobil Chemical) at 1-5 wt % (based on silica weight) using a DSM twin-screw miniature extrusion mixer running at 180-185° C., 50 RPM, for 3 minutes. 0.1% of BHT stabilizer was added in each batch. The A1 blend is a control prepared by sending Exceed and 0.1% BHT stabilizer through the extrusion mixer for 3 minutes (without silica-PE). The results are set forth below in Table 1.

TABLE 1

(Young's Modulus of Blends)

| Sample | Blend | Silica loading (wt %) | Modulus/ A1 Modulus |
| --- | --- | --- | --- |
| A1* | Exceed | 0 | 1 |
| A2 | Exceed + PE-silica 1 | 1 | 1.09 |
| A3 | Exceed + PE-silica 1 | 2 | 1.16 |
| A4 | Exceed + PE-silica 1 | 5 | 1.71 |
| A5 | Exceed + PE-silica 2 | 1 | 1.33 |
| A6 | Exceed + PE-silica 2 | 2 | 1.55 |
| A7 | Exceed + PE-silica 2 | 5 | 2.18 |
| A8 | Exceed + silica-PODA-PE | 1 | 1.02 |
| A9 | Exceed + silica-PODA-PE | 2 | 1.24 |

*not an example of the present disclosure

Figure 6:
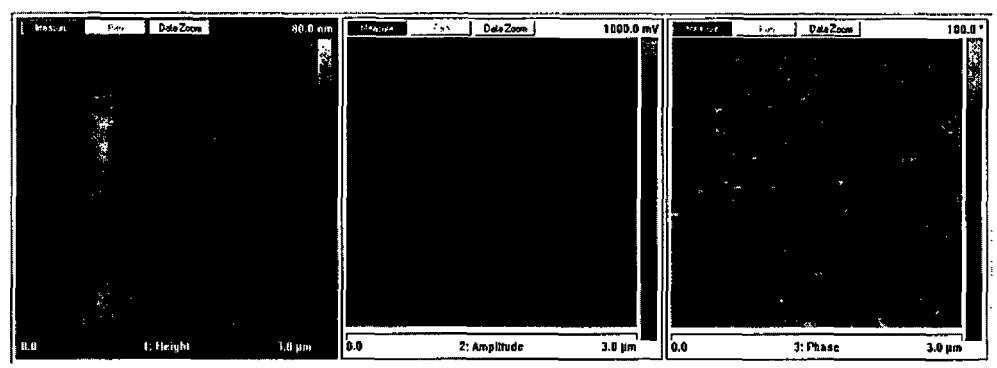
FIG. 6 is an AFM image of Exceed+2% PE-silica 1.
Figure 7:
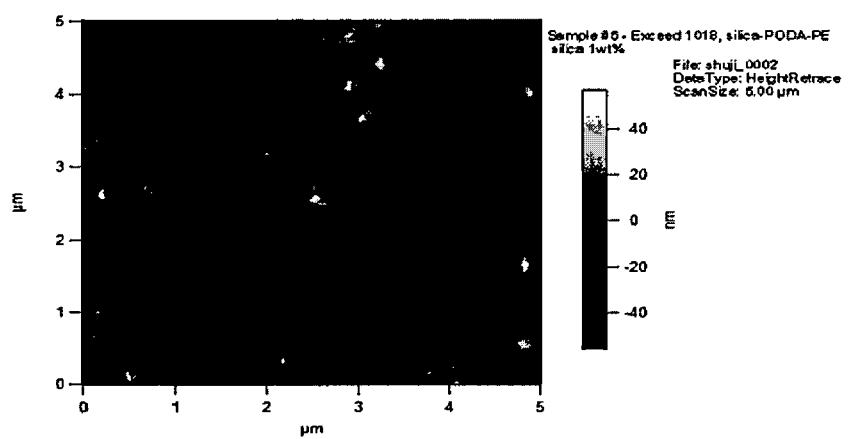
FIG. 7 is an AFM image of Exceed+1% silica-PODA-PE.

AFM images of samples A3 and A8 are shown in FIG. 6 and FIG. 7, respectively. Single silica particle dispersion in LLDPE is clearly indicated in both cases without any clustering of silica particles. In sample A7, which contains 5 wt % silica, a 118% increase in LLDPE modulus was obtained.

PCT/EP Clauses

1. A process for making a silica-polyolefin composite, comprising:
   (a) reacting silica particles and an alkyl halosilane in the presence of a first solvent and a catalyst to form silane-functionalized silica particles and
   (b) reacting the silane-functionalized silica particles with a vinyl-terminated polyolefin in the presence of a second solvent.

2. The process of clause 1, wherein the olefins of the polyolefin of the vinyl-terminated polyolefin have from 2 to 8 carbons per monomeric unit.

3. The process of clause 2, wherein the vinyl-terminated polyolefin is selected from the group consisting of vinyl-terminated polyethylene and vinyl-terminated polypropylene.

4. The process of any of clauses 1 to 3, wherein the alkyl halosilane is selected from the group consisting of dimethylchlorosilane and chloro(methyl)phenylsilane.

5. The process of any of clauses 1 to 4, wherein the alkyl halosilane is dimethylchlorosilane.

6. The processes of any of clauses 1 to 5 wherein the silica and halosilane are present in an equivalent concentration ratio (silica/halosilane) of from 0.05 to 20.

7. The process of any of clauses 1 to 6 wherein the silane-functionalized silica and vinyl-terminated polyolefin are present in an equivalent concentration ratio (silica/polyolefin) of from 2 to 100.

8. The process of any of clauses 1 to 7, wherein the first solvent is selected from the group consisting of toluene, anisole, xylenes, methyl ethyl ketone, dichloromethane, and chlorobenzene.

9. The process of any of clauses 1 to 8, wherein the second solvent is selected from the group consisting of toluene, anisole, xylenes, chlorobenzene, and trichlorobenzene.

10. The process of any of clauses 1 to 9, wherein the first solvent and the second solvent are the same.

11. The process of any of clauses 1 to 10, wherein step (a) is carried out at a temperature of 20° C. to 150° C. and for a time of 0.5 hour to 72 hours.

12. The process of any of clauses 1 to 11, wherein step (b) is carried out at a temperature of 80° C. to 150° C. and for a time of 1 hour to 72 hours.

13. A process for making a silica-polyolefin composite, comprising:

(a) reacting silica particles and a mercapto alkylalkoxysilane in the presence of a first solvent and a catalyst to form thiol-functionalized silica particles and (b) reacting the thiol-functionalized silica particles with a vinyl-terminated polyolefin in the presence of a second solvent.

14. A process of clause 13, wherein the olefins of the polyolefin of the vinyl-terminated polyolefin have from 2 to 8 carbons per monomeric unit.

15. The process of clause 14, wherein the vinyl-terminated polyolefin is selected from the group consisting of vinyl-terminated polyethylene and vinyl-terminated polypropylene.

16. The process of any of clauses 13 to 15, wherein the mercapto alkylalkoxysilane is selected from the group consisting of 3-mercaptopropyltrimethoxysilane, 3-mercaptopropyltriethoxysilane, 3-mercaptopropylmethyldimethoxysilane.

17. The process of clause 16, wherein the mercapto alkylalkoxysilane is 3-mercaptopropyltrimethoxysilane.

18. The process of any of clauses 13 to 17, wherein the silica and mercapto alkylalkoxysilane are present in an equivalent concentration ratio (silica/mercapto alkylalkoxysilane) of from 0.05 to 20.

19. The process of any of clauses 13 to 18, wherein the thiol-functionalized silica and vinyl-terminated polyolefin are present in an equivalent concentration ratio (silica/polyolefin) of from 2 to 100.

20. The process of any of clauses 13 to 19, wherein the first solvent is selected from toluene, anisole, xylene(s), methyl ethyl ketone, dichloromethane, chlorobenzene.

21. The process of any of clauses 13 to 20, wherein the second solvent is selected from toluene, anisole, xylene(s), chlorobenzene, dichlorobenzene, trichlorobenzene.

22. The process of any of clauses 13 to 21, wherein the first solvent and the second solvent are the same.

23. The process of any of clauses 13 to 22, wherein the catalyst in step (b) is selected from 2,2'-azoisobutyronitrile (AIBN), dicumylperoxide, benzophenone, thioxanthone, camphorquinone, (2,4,6-trimethylbenzoyl)diphenylphosphine oxide, 2,2-dimethoxy-2-phenyl acetophenone, trimethylolpropane tris(2-mercaptoacetate).

24. The process of any of clauses 13 to 23, wherein step (a) is carried out at a temperature of 20° C. to 150° C. and for a time from 0.5 hour to 72 hours.

25. The process of any of clauses 13 to 24, wherein step (b) is carried out at a temperature of 80° C. to 150° C. and for a time from 1 hour to 72 hours.

26. A process for making a silica-polyolefin composite, comprising:

(a) reacting silica particles and 1-(chlorosilyl)propyl 2-bromoisobutyrate in the presence of a first solvent and a base to form silylpropyl 2-bromoisobutyrate-functionalized silica particles;

(b) polymerizing alkyl acrylate at the surfaces of the silylpropyl 2-bromoisobutyrate-functionalized particles in the presence of a second solvent to form polyacrylate-functionalized silica particles;

(c) capping the polyacrylate-functionalized silica particles via reaction with acrylic acid in the presence of a third solvent;

(d) reacting vinyl-terminated polyolefin with an alkylchlorosilane in the presence of a fourth solvent and a catalyst to form an alkylchlorosilane-functionalized polyolefin;

(e) reacting the alkylchlorosilane-functionalized polyolefin and the polyacrylate-functionalized silica particles in the presence of a fifth solvent.

27. The process of clause 26, wherein the vinyl-terminated polyolefin is selected from the group consisting of vinyl-terminated polyethylene and vinyl-terminated polypropylene.

28. The reaction of either of clause 26 and 27, wherein the 1-(chlorosilyl)propyl 2-bromoisobutyrate is prepared by reacting allyl 2-bromo-2-methylpropionate and alkylchlorosilane in the presence of a catalyst.

29. The reaction of any of clauses 26 to 28, wherein the alkylchlorosilane is selected from the group consisting of dimethylchlorosilane, and chloro(methyl)phenylsilane.

30. The reaction of clause 29, wherein the alkylchlorosilane is dimethylchlorosilane.

31. The process of any of clauses 26 to 30, wherein the 1-(chlorosilyl)propyl 2-bromoisobutyrate and silica are present in an equivalent concentration ratio (1-(chlorosilyl)propyl 2-bromoisobutyrate/silica) of 0.05 to 20.

32. The process of any of clauses 26 to 31, wherein the base is selected from the group consisting of hexamethyldisilazane, pyridine, and imidazole.

33. The process of any of clauses 26 to 32, wherein the first solvent is selected from the group consisting of methyl ethyl ketone, toluene, and anisole.

34. The process of any of clauses 26 to 33, wherein step (a) is carried out at a temperature of 20° C. to 120° C. and for a time from 0.5 hour to 72 hours.

35. The process of any of clauses 26 to 34, wherein the alkyl acrylate is selected from the group consisting of octadecyl acrylate and longer alkyl acrylates.

36. The process of any of clauses 26 to 35, wherein the alkyl acrylate and silylpropyl 2-bromoisobutyrate-functionalized silica are present in an equivalent concentration ratio (acrylate/silica) of from 1 to 100.

37. The process of any of clauses 26 to 36, wherein second solvent is selected from the group consisting of toluene, anisole, and xylenes.

38. The process of any of clauses 26 to 37, wherein step (b) is carried out at a temperature of 50° C. to 120° C. and for a time from 12 hour to 240 hours.

39. The process of any of clauses 26 to 38, wherein the acrylic acid and polyacrylate-functionalized silica are present in an equivalent concentration ratio (acrylic acid/silica) of from 0.05 to 2.

40. The process of any of clauses 26 to 39, wherein the third solvent is selected from the group consisting of toluene, anisole, and xylenes.

41. The process of any of clauses 26 to 40, wherein step (c) is carried out at a temperature of 50° C. to 120° C. and for a time from 1 hour to 72 hours.

42. The process of any of clauses 26 to 41, wherein the alkylchlorosilane is selected from the group consisting of chlorodimethylsilane and chloro(methyl)phenylsilane.

43. The process of any of clauses 26 to 42, wherein the alkylchlorosilane and vinyl-terminated polyolefin are present in an equivalent concentration ratio (alkylchlorosilane/polyolefin) of from 1 to 100.

44. The process of any of clauses 26 to 43, wherein the fourth solvent is selected from the group consisting of toluene, xylenes, chlorobenzene, dichlorobenzene, and trichlorobenzene.

45. The process of any of clauses 26 to 44, wherein step (d) is carried out at a temperature of 80° C. to 150° C. and for a time from 1 hour to 72 hours, in the presence of a catalyst.

46. The process of any of clauses 26 to 45, wherein the alkylchlorosilane-functionalized polyolefin and polyacrylate-functionalized silica are present in an equivalent concentration ratio (polyolefin/silica) of from 0.05 to 20.

47. The process of any of clauses 26 to 46, wherein the fifth solvent is selected from the group consisting of toluene, xylenes, chlorobenzene, dichlorobenzene, and trichlorobenzene.

48. The process of any of clauses 26 to 47, wherein step (e) is carried out at a temperature of 80° C. to 150° C. and for a time from 12 hours to 72 hours.

49. A process for making a silica-polyolefin composite, comprising reacting silica particles, a mercapto alkylalkoxysilane, and a vinyl-terminated polyolefin together in the presence of a catalyst.

50. The process of clause 49, wherein the olefins of the polyolefin of the vinyl-terminated polyolefin have from 2 to 8 carbons per monomeric unit.

51. The process of clause 50, wherein the vinyl-terminated polyolefin is selected from the group consisting of vinyl-terminated polyethylene and vinyl-terminated polypropylene.

52. The process of any of clauses 49 to 51, wherein the mercapto alkylalkoxysilane is selected from the group consisting of 3-mercaptopropyltrimethoxysilane, 3-mercaptopropyltriethoxysilane, and 3-mercaptopropylmethyldimethoxysilane.

53. The process of clause 49, wherein the mercapto alkylalkoxysilane is 3-mercaptopropyltrimethoxysilane.

54. The process of any of clauses 49 to 53, wherein the silica and mercapto alkylalkoxysilane are present in an equivalent concentration ratio (silica/mercapto alkylalkoxysilane) of from 0.05 to 20 equivalents; wherein the silica and vinyl-terminated polyolefin are present in an equivalent concentration ratio (silica/polyolefin) of from 1 to 100.

55. The process of any of clauses 49 to 54, wherein the process is a reactive extrusion process.

56. The process of any of clauses 49 to 55, wherein the catalyst is selected from 2,2'-azoisobutyronitrile (AIBN), dicumylperoxide, benzophenone, thioxanthone, camphorquinone, (2,4,6-trimethylbenzoyl)diphenylphosphine oxide, 2,2-dimethoxy-2-phenyl acetophenone, and trimethylolpropane tris(2-mercaptoacetate).

57. The process of clause 55, wherein the process is carried out at a temperature of 120° C. to 220° C. for a time of 0.5 minute to 1 hour in an extruder operating at RPM 30-100.

58. A process for making an alpha zirconium phosphate-polyolefin composite, comprising:
(a) reacting a vinyl terminated polyolefin with a peroxyacid in the presence of a first solvent to form an epoxy-terminated polyolefin;
(b) reacting the epoxy-terminated polyolefin with an amine-terminated polyalkylene glycol in the presence of a second solvent and a catalyst to form a polyalkylene glycol-terminated polyolefin;
(c) reacting the polyalkylene glycol-terminated polyolefin and an alpha zirconium phosphate in the presence of a third solvent.

59. The process of clause 58, wherein the olefins of the polyolefin of the vinyl-terminated polyolefin have from 2 to 8 carbons per monomeric unit.

60. The process of clause 59, wherein the vinyl-terminated polyolefin is selected from the group consisting of vinyl-terminated polyethylene and vinyl-terminated polypropylene.

61. The process of any of clauses 58 to 60, wherein the peroxyacid is selected from the group consisting of 3-chloroperbenzoic acid and hydrogen peroxide.

62. The process of clause 61, wherein the peroxyacid is 3-chloroperbenzoic acid.

63. The process of any of clauses 58 to 60, wherein the peroxyacid and vinyl-terminated polyolefin are present in an equivalent concentration ratio (peroxyacid/polyolefin) of from 1 to 5.

64. The process of any of clauses 58 to 63, wherein the first solvent is selected from toluene, xylenes, chlorobenzene, dichlorobenzene, and trichlorobenzene.

65. The process of any of clauses 58 to 64, wherein step (a) is carried out at a temperature of 80° C. to 120° C. and for a time from 1 hour to 72 hours.

66. The process of any of clauses 58 to 65, wherein the amine-terminated polyalkylene glycol is selected from the group consisting of di- or poly-amine-functionalized polyethylene glycol, di- or multi-amine-functionalized polypropylene glycol, and poly(ethylene-co-propylene)glycol.

67. The process of any of clauses 58 to 66, wherein the amine-terminated polyalkylene glycol and epoxy-terminated polyolefin are present in an equivalent concentration ratio (polyalkylene glycol/polyolefin) of from 1 to 100.

68. The process of any of clauses 58 to 67, wherein the second solvent is selected from toluene, xylenes, chlorobenzene, dichlorobenzene, and trichlorobenzene.

69. The process of any of clauses 58 to 68, wherein step (b) is carried out at a temperature of 80° C. to 150° C. and for a time of 1 hour to 72 hours.

70. The process of any of clauses 58 to 69, wherein the polyalkylene glycol-terminated polyolefin and alpha zirconium phosphate are present in an equivalent concentration ratio (polyolefin/ZrP) of from 0.05 to 20.

71. The process of any of clauses 58 to 70, wherein the third solvent is selected from toluene and xylenes.

72. The process of any of clauses 58 to 71, wherein step (c) is carried out at a temperature of 80° C. to 150° C. and for a time from 1 hour to 72 hours.

73. A process for making an alpha zirconium phosphate-polyolefin composite, comprising:
(a) reacting an alpha zirconium phosphate with thioamine in the presence of a solvent to form a thioamine-substituted alpha zirconium phosphate and
(b) reacting the thioamine-substituted alpha zirconium phosphate with a vinyl-terminated polyolefin in the presence of a catalyst.

74. The process of clause 73, wherein the olefins of the polyolefin of the vinyl-terminated polyolefin have from 2 to 8 carbons per monomeric unit.

75. The process of clause 74, wherein the vinyl-terminated polyolefin is selected from the group consisting of vinyl-terminated polyethylene and vinyl-terminated polypropylene.

76. The process of any of clauses 73 to 75, wherein the thioamine is selected from the group consisting of cysteamine, 3-mercapto-N-nonylpropionamide, 11-azido-1-undecanethiol, cysteamine hydrochloride, 3-amino-1-propanethiol hydrochloride, 6-amino-1-propanethiol hydrochloride, and (11-mercaptoundecyl)-N,N,N-trimethylammonium bromide.

77. The process of clause 76, wherein the thioamine is cysteamine.

78. The process of any of clauses 73 to 77 wherein the thioamine and alpha zirconium phosphate are present in an equivalent concentration ratio (thioamine/ZrP) of 1 to 100.

79. The process of any of clauses 73 to 78, wherein the solvent is selected from water and ethanol.

80. The process of any of clauses 73 to 79, wherein step (a) is carried out at a temperature of 20° C. to 50° C. and for a time of 1 hour to 72 hours.

81. The process of any of clauses 73 to 80, wherein the vinyl-terminated polyolefin and thioamine-substituted alpha zirconium phosphate are present in an equivalent concentration ratio (polyolefin/ZrP) of from 0.05 to 20.

82. The process of any of clauses 73 to 81, wherein step (b) is a reactive extrusion process.

83. The process of any of clauses 73 to 82, wherein the catalyst is selected from 2,2'-azoisobutyronitrile (AIBN), dicumylperoxide, benzophenone, thioxanthone, camphorquinone, (2,4,6-trimethylbenzoyl)diphenylphosphine oxide, 2,2-dimethoxy-2-phenyl acetophenone, trimethylolpropane tris(2-mercaptoacetate).

84. The process of clause 83, wherein the catalyst is dicumyl peroxide.

85. The process of any of clauses 73 to 84, wherein step (b) is carried out at a temperature of 120° C. to 220° C. and for a time of 1 minute to 1 hour in an extruder operating at an RPM of 30 to 100.

86. A process for making an alpha zirconium phosphate-polyolefin composite, comprising reacting alpha zirconium phosphate particles, a thioamine, and a vinyl-terminated polyolefin together (a) in the presence of a catalyst in a solvent or (b) in an extruder with the vinyl-terminated polyolefin in a molten state in the presence of a catalyst.

87. The process of clause 86, wherein the vinyl-terminated polyolefin is a vinyl-terminated polyethylene.

88. The process of any of clauses 86 to 87, wherein the thioamine is selected from the group consisting of cysteamine, 3-mercapto-N-nonylpropionamide, 11-azido-1-undecanethiol, cysteamine hydrochloride, 3-amino-1-propanethiol hydrochloride, 6-amino-1-propanethiol hydrochloride, and (11-mercaptoundecyl)-N,N,N-trimethylammonium bromide.

89. The process of clauses 88, wherein the thioamine is cysteamine.

90. The process of any of clauses 86 to 89, wherein the thioamine and alpha zirconium phosphate are present in an equivalent concentration ratio (thioamine/ZrP) of 1 to 100.

91. The process of any of clauses 86 to 90, wherein the vinyl-terminated polyolefin and thioamine-substituted alpha zirconium phosphate are present in an equivalent concentration ratio (polyolefin/ZrP) of 0.05 to 20.

92. The process of any of clauses 86 to 91, wherein the catalyst is selected from 2,2'-azoisobutyronitrile (AIBN), dicumylperoxide, benzophenone, thioxanthone, camphorquinone, (2,4,6-trimethylbenzoyl)diphenylphosphine oxide, 2,2-dimethoxy-2-phenyl acetophenone, trimethylolpropane tris(2-mercaptoacetate).

93. The process of clauses 92, wherein the catalyst is dicumyl peroxide.

94. The process of any of clauses 86 to 91, wherein the solvent is selected from the group consisting of toluene and xylenes.

95. The process of any of clauses 86 to 94, wherein process (a) is carried out at a temperature of 100° C. to 160° C. and for a time of 0.5 minute to 24 hours.

96. The process of any of clauses 86 to 95, wherein process (b) is carried out at a temperature of 160° C. to 220° C. and for a time of 0.5 minute to 30 minutes, wherein an extruder is operated at 30 to 500 RPM.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. Likewise, the term "comprising" is considered synonymous with the term "including" for purposes of Australian law.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains. The disclosure has been described above with reference to numerous embodiments and specific examples. Many variations will suggest themselves to those skilled in this art in light of the above detailed description. All such obvious variations are within the full intended scope of the appended claims.

What is claimed is:

1. A process for making a silica-polyolefin composite, comprising:
   (a) reacting silica particles and an alkyl halosilane in the presence of a first solvent and a catalyst to form silane-functionalized silica particles and
   (b) reacting the silane-functionalized silica particles with a vinyl-terminated polyolefin in the presence of a second solvent.

2. The process of claim 1, wherein the olefins of the polyolefin of the vinyl-terminated polyolefin have from 2 to 8 carbons per monomeric unit.

3. The process of claim 2, wherein the vinyl-terminated polyolefin is selected from the group consisting of vinyl-terminated polyethylene and vinyl-terminated polypropylene.

4. The process of claim 1, wherein the alkyl halosilane is selected from the group consisting of dimethylchlorosilane and chloro(methyl)phenylsilane.

5. The process of claim 4, wherein the alkyl halosilane is Dimethylchlorosilane.

6. The process of claim 1 wherein the silica and halosilane are present in an equivalent concentration ratio (silica/halosilane) of from 0.05 to 20.

7. The process of claim 1 wherein the silane-functionalized silica and vinyl-terminated polyolefin are present in an equivalent concentration ratio (silica/polyolefin) of from 2 to 100.

8. The process of claim 1, wherein the first solvent is selected from the group consisting of toluene, anisole, xylenes, methyl ethyl ketone, dichloromethane, and chlorobenzene.

9. The process of claim 1, wherein the second solvent is selected from the group consisting of toluene, anisole, xylenes, chlorobenzene, and trichlorobenzene.

10. The process of claim 1, wherein the first solvent and the second solvent are the same.

11. The process of claim 1, wherein step (a) is carried out at a temperature of 20° C. to 150° C. and for a time of 0.5 hour to 72 hours.

12. The process of claim 1, wherein step (b) is carried out at a temperature of 80° C. to 150° C. and for a time of 1 hour to 72 hours.

13. A process for making a silica-polyolefin composite, coin rising:
   (a) reacting silica particles and a mercapto alkylalkoxysilane in the presence of a first solvent and a catalyst to form thiol-functionalized silica particles and
   (b) reacting the thiol-functionalized silica particles with a vinyl-terminated polyolefin in the presence of a second solvent.

14. The process of claim 13, wherein the olefins of the polyolefin of the vinyl-terminated polyolefin have from 2 to 8 carbons per monomeric unit.

15. The process of claim 14, wherein the vinyl-terminated polyolefin is selected from the group consisting of vinyl-terminated polyethylene and vinyl-terminated polypropylene.

16. The process of claim 13, wherein the mercapto alkylalkoxysilane is selected from the group consisting of 3-mercaptopropyltrimethoxysilane, 3-mercaptopropyltriethoxysilane, 3-mercaptopropylmethylditnethoxysilane.

17. The process of claim 16, wherein the mercapto alkylakoxysilane is 3-mercaptopropyltrimethoxysilane.

18. The process of claim 13, wherein the silica and mercapto alkylalkoxysilane are present in an equivalent concentration ratio (silica/mercapto alkylalkoxysilane) of from 0.05 to 20.

19. The process of claim 13, wherein the thiol-functionalized silica and vinyl-terminated polyolefin are present in an equivalent concentration ratio (silica/polyolefin) of from 2 to 100.

20. The process of claim 13, wherein the first solvent is selected from toluene, anisole, xylene(s), methyl ethyl ketone, dichloromethane, chlorobenzene.

21. The process of claim 13, wherein the second solvent is selected from toluene, anisole, xylene(s), chlorobenzene, dichlorobenzene, trichlorobenzene.

22. The process of claim 13, wherein the first solvent and the second solvent are the same.

23. The process of claim 13, wherein a catalyst is used in step (b) and is selected from 2,2'-azoisobutyronitrile (AIBN), dicumylperoxide, benzophenone, thioxanthone, carnphorquinone, (2,4,6-trimethylbenzoyediphenylphosphine oxide, 2,2-dimethoxy-2-phenyl acetophenone, trimethylolpropane tris(2-mercaptoacetate).

24. The process of claim 13, wherein step(a) is carried out at a temperature of 20° C. to 150° C. and for a time from 0.5 hour to 72 hours.

25. The process of claim 13, wherein step (b) is carried out at a temperature of 80° C. to 150° C. and for a time from 1 hour to 72 hours.

26. A process for making a silica-polyolefin composite, comprising:
   (a) reacting silica particles and 1-(chlorosilyl)propyl 2-bromoisobutyrate in the presence of a first solvent and a base to form silylpropyl 2-bromoisobutyrate-functionalized silica particles;
   (b) polymerizing alkyl acrylate at the surfaces of the silylpropyl 2-bromoisobutyrate-functionalized particles in the presence of a second solvent to form polyacrylate-functionalized silica particles;
   (c) capping the polyacrylate-functionalized silica particles via reaction with acrylic acid in the presence of a third solvent;
   (d) reacting vinyl-terminated polyolefin with an alkylchlorosilane in the presence of a fourth solvent and a catalyst to form an alkylchlorosilane-functionalized polyolefin;
   (e) reacting the alkylchlorosilane-functionalized polyolefin and the polyacrylate-functionalized silica particles in the presence of a fifth solvent.

27. The process of claim 26, wherein the vinyl-terminated polyolefin is selected from the group consisting of vinyl-terminated polyethylene and vinyl-terminated polypropylene.

28. The reaction of claim 26, wherein the 1-(chlorosilyl) propyl 2-bromoisobutyrate is prepared by reacting allyl 2-bromo-2-methylpropionate and alkylchlorosilane in the presence of a catalyst.

29. The reaction of claim 26, wherein the alkylchlorosilane is selected from the group consisting of dimethylchlorosilane, and chloro(methyl)phenylsilane.

30. The reaction of claim 29, wherein the alkylchlorosilane is dimethylchlorosilane.

31. The process of claim 26, wherein the 1-(chlorosilyl) propyl 2-bromoisobutyrate and silica are present in an equivalent concentration ratio (1-(chlorosilyppropyl 2-bromoisobutyratesilica) of 0.05 to 20.

32. The process of claim 26, wherein the base is selected from the group consisting of hexamethyldisilazane, pyridine, and imidazole.

33. The process of claim 26, wherein the first solvent is selected from the group consisting of methyl ethyl ketone, toluene, and anisole.

34. The process of claim 26, wherein step (a) is carried out at a temperature of 20° C. to 120° C. and for a time from 0.5 hour to 72 hours.

35. The process of claim 26, wherein the alkyl acrylate is selected from the group consisting of octadecyl acrylate and longer alkyl acrylates.

36. The process of claim 26, wherein the alkyl acrylate and silylpropyl 2-bromoisobutyrate-functionalized silica are present in an equivalent concentration ratio (acrylate/silica) of from 1 to 100.

37. The process of claim 26, wherein second solvent is selected from the group consisting of toluene, anisole, and xylenes.

38. The process of claim 26, wherein step (b) is carried out at a temperature of 50° C. to 120° C. and for a time from 12 hour to 240 hours.

39. The process of claim 26, wherein the acrylic acid and polyacrylate-functionalized silica, are present in an equivalent concentration ratio (acrylic acid/silica) of from 0.05 to 2.

40. The process of claim 26, wherein the third solvent is selected from the group consisting of toluene, anisole, and xylenes.

41. The process of claim 26, wherein step (c) is carried out at a temperature of 50° C. to 120° C. and for a time from 1 hour to 72 hours.

42. The process of claim 26, wherein the alkylchlorosilane is selected from the group consisting of chlorodimethylsilane and chloro(methyl)phenylsilane.

43. The process of claim 26, wherein the alkylchlorosilane and vinyl-terminated polyolefin are present in an equivalent concentration ratio (alkylchlorosilane/polyolefin) of from 1 to 100.

44. The process of claim 26, wherein the fourth solvent is selected from the group consisting of toluene, xylenes, chiorobenzene, dichlorobenzene, and trichlorohenzene.

45. The process of claim 26, wherein step (d) is carried out at a temperature of 80° C. to 150° C. and for a time from 1 hour to 72 hours, in the presence of a catalyst.

46. The process of claim 26, wherein the alkylchlorosilane-functionalized polyolefin and polyacrylate-functionalized silica are present in an equivalent concentration ratio (polyolefin/silica) of from 0.05 to 20.

47. The process of claim 26, wherein the fifth solvent is selected from the group consisting of toluene, xylenes, chiorobenzene, dichlorobenzene, and trichlorohenzene.

48. The process of claim 26, wherein step (e) is carried out at a temperature of 80° C. to 150° C. and for a time from 12 hours to 72 hours.

* * * * *